(12) United States Patent
Cao et al.

(10) Patent No.: US 10,007,733 B1
(45) Date of Patent: Jun. 26, 2018

(54) HIGH-PERFORMANCE NETWORK DATA CAPTURE AND STORAGE

(71) Applicant: EMC Corporation, Hopkinton, MA (US)

(72) Inventors: Yu Cao, Beijing (CN); Zhe Dong, Beijing (CN); Simon Tao, Shanghai (CN); Xiaoyan Guo, Beijing (CN); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 354 days.

(21) Appl. No.: 14/734,037

(22) Filed: Jun. 9, 2015

(51) Int. Cl.
*G06F 17/30* (2006.01)

(52) U.S. Cl.
CPC .. *G06F 17/30867* (2013.01); *G06F 17/30705* (2013.01); *G06F 17/30876* (2013.01)

(58) Field of Classification Search
CPC ......... G06F 17/30867; G06F 17/30705; G06F 17/30876
See application file for complete search history.

(56) References Cited

U.S. PATENT DOCUMENTS

| | | | | |
|---|---|---|---|---|
| 6,418,433 B1* | 7/2002 | Chakrabarti | ...... | G06F 17/30864 |
| 7,424,484 B2* | 9/2008 | Ma | ...... | G06F 17/30864 |
| 7,774,782 B1* | 8/2010 | Popescu | ...... | G06F 9/505 709/202 |
| 8,555,388 B1* | 10/2013 | Wang | ...... | H04L 63/1416 709/245 |
| 2012/0023127 A1* | 1/2012 | Kirshenbaum | .... | G06Q 30/0201 707/769 |
| 2012/0110063 A1* | 5/2012 | Prasad | ...... | G06Q 10/06 709/203 |
| 2016/0092274 A1* | 3/2016 | Singh | ...... | G06F 9/5027 718/104 |

* cited by examiner

*Primary Examiner* — Alexander Khong
(74) *Attorney, Agent, or Firm* — Ryan, Mason & Lewis, LLP (57) ABSTRACT

One or more resource identifiers are obtained, wherein the one or more resource identifiers are extracted from a content page obtained over a computer network. One or more irrelevant resource identifiers are filtered out from the one or more extracted resource identifiers. One or more resource identifiers remaining after the filtering step are classified into one or more classifications from a given set of classifications, wherein each of the given set of classifications has a dedicated network search component associated therewith. In response to the classifying step, the one or more classified resource identifiers are inserted into a seed set of resource identifiers associated with a dedicated network search component corresponding to the classification of the one or more classified resource identifiers.

19 Claims, 7 Drawing Sheets

HIGH-PERFORMANCE NETWORK DATA CAPTURE AND STORAGE

FIELD

The field relates generally to computing environments, and more particularly to data capture and storage in such computing environments.

BACKGROUND

Big data is a phrase given to data sets that are so large or complex that traditional data processing applications cannot adequately process the data. Data sets that are considered big data typically include voluminous amounts of structured, semi-structured and/or unstructured data that have the potential to be data mined for information. Big data is playing more and more of a critical role in driving rapid business growth. Nowadays, most enterprises and organizations have realized the significance of big data and started to investigate proper approaches to leveraging big data for various purposes. However, before big data can be leveraged and analyzed to derive value, it has to be captured and stored.

Among the diverse sources of big data, the fast expanding World Wide Web (referred to herein simply as the web) connected by the Internet is an extremely important source and is of great interest to big data advocates. Many commercial and research institutions run their web crawling systems (web crawlers) to capture data from the web. Web crawlers are an important component of web search engines, where they are used to collect the corpus of web pages indexed by the search engine. Moreover, web crawlers are used in many other applications that process large numbers of web pages, such as web data mining, comparison shopping engines, and so on.

SUMMARY

Embodiments of the invention provide techniques for data capture and storage in a computing environment.

For example, in one embodiment, a method comprises the following steps. One or more resource identifiers are obtained wherein the one or more resource identifiers are extracted from a content page obtained over a computer network. One or more irrelevant resource identifiers are filtered out from the one or more extracted resource identifiers. One or more resource identifiers remaining after the filtering step are classified into one or more classifications from a given set of classifications, wherein each of the given set of classifications has a dedicated network search component associated therewith. In response to the classifying step, the one or more classified resource identifiers are inserted into a seed set of resource identifiers associated with a dedicated network search component corresponding to the classification of the one or more classified resource identifiers.

Advantageously, illustrative embodiments provide efficient web (computer network) data capture and storage, which not only minimize or eliminate irrelevant crawling (search) path explorations, but also enable resource scheduling with finer-grained control, so as to optimize web data crawling performance.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "data repository," "data center," "data processing system," "computing system," "computing environment," "data storage system," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

Furthermore, while the Word Wide Web is used herein when describing illustrative embodiments, it is to be appreciated that embodiments may be implemented with other computer networks and/or computing environments.

Figure 1:
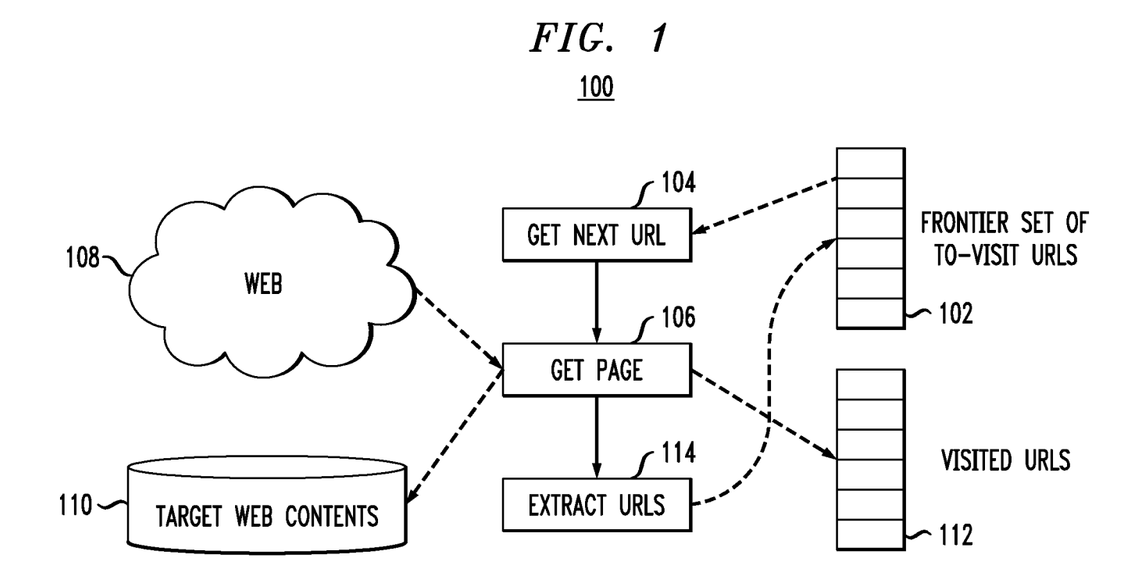
FIG. 1 illustrates a web crawling system, according to an embodiment of the invention.

As illustrated in FIG. 1, a web crawling system (web crawler) 100 starts with a frontier (seed) set 102 of to-visit uniform resource locators (URLs), downloads the associated web pages (get next URL' step 104, 'get page' step 106 from Web 108, store target Web contents in storage 110, and store visited URLs in visited URL set 112), extracts the URLs contained therein (extract URLs' step 114), adds those URLs that have not been visited before to the frontier set 102 of to-visit URLs, and recursively continues to download the web pages identified by to-visit URLs.

As is known, a uniform resource locator, or URL, is a reference to a resource that specifies the location of the resource on a computer network and a mechanism for retrieving it. A URL is a specific type of uniform resource identifier (URI).

In general, URLs in the frontier set should be crawled in such a sequence as to maximize the utility of the crawled corpus. Factors that influence the utility are the aggregate quality of the pages, the demand for certain pages and topics (also known as focused crawling), and the freshness of the individual pages (freshness refers to the time duration from the creation date of the page to the present date, i.e., the shorter the time duration, the fresher the page). In a web crawler, these factors would be considered when deciding on the crawling priority of a page, e.g., a high-quality, highly-demanded and fast-changing page would be re-crawled frequently, while high-quality yet slow-changing pages or fast-changing yet low-quality pages would receive a lower priority. Such URL prioritization determines the visiting sequence of URLs in the frontier set.

As the size of the web grows, it becomes imperative to decentralize the crawling process, in order to finish downloading pages in a reasonable amount of time and freshness. In a distributed web crawler, the URLs in the frontier set are distributed among a cluster of crawling workers, each of which concurrently fetches web pages of assigned URLs. Usually, the URL assignment to crawling workers is based on the URL's host name. In other words, URLs belonging to a single host will be handled by a dedicated crawling worker, which can be multi-threading.

The web can be considered a directed graph of interlinked web pages. Between an origin page and a destination page, there may be multiple URL paths comprising different intermediate web pages. A challenge facing web crawling lies in how to efficiently detect crawling URL paths of the lowest crawling costs from seed URLs to destination web pages, without too many irrelevant attempts which degrade the crawling performance and incur extra resource consumption.

In many application scenarios, the users know either roughly or exactly where to find the web data that interests them. For example, if a reader wants to read some random National Basketball Association ("NBA") news at a news website, the reader's web browsing behavior would likely be as follows: open the website homepage, enter the "Sports" news category, and then find the "Basketball" news, and finally arrive at the "NBA" column.

In the above example, there exists a concrete and shortest URL path from the website homepage (to "Sports" page link to "Basketball" page link) to "NBA" pages. On such a URL path, a succeeding URL is contained in the web page of its preceding URL. Even though the reader may not know the exact URL of a specific NBA page, the reader knows how to efficiently discover the URL as the reader knows the URL path.

In illustrative embodiments of the invention, we consider a web crawling application scenario, where explicit knowledge on the crawling URL paths from seed URLs to destination web pages is available to the users. As explained below, conventional web crawlers fail to take advantage of such crawling path knowledge and thus miss opportunities to further optimize the crawling performance and resource scheduling.

The conventional web crawling procedure is, more or less, blindly exploratory in nature, i.e., the web crawler knows what the target web data will look like, but does not know their locations (i.e., URLs) on the web. As such, the web crawler keeps searching for different potential crawling paths from the seed URLs down to the destination web pages, and the above-mentioned URL crawling prioritization makes the crawling path exploration pattern essentially one of Breadth-First Search (BFS), Depth-First Search (DFS) or a hybrid of both. In this case, irrelevant web pages would be accessed, downloaded and parsed as a result of irrelevant crawling path explorations, which in turn degrades the overall web crawling performance and increases wasteful resource consumption.

In the above example, if a conventional web crawler is asked to take the website homepage as the seed URL and retrieve NBA news, it may also navigate through pages of political news and entertainment news before finding that they turn out to be irrelevant.

On the other hand, it is difficult, if not impossible, with existing approaches to encode specific crawling paths into the URL crawling priorities and guide the web crawler to follow exactly the paths.

Different characteristics of URLs on the crawling paths may require different implementations and configurations, in terms of, for instance, frontier set URL prioritization policies, "polite crawling" enforcement policies (to minimize load on web servers and respect websites' Robot Exclusion Protocol, i.e., robots.txt), replicated web content detection mechanism and distributed crawling approach, and so on. However, it is difficult for a conventional web crawler to realize such a fine level of control granularity.

Similarly, crawling URLs of different crawling path nodes may consume different amounts of resources (e.g., compute, memory and storage capacity), and the resource demands may shift over time due to Web and crawling workload changes. In order to optimize the overall resource utilization, it is desirable to enable dynamic resource scheduling among the different URLs on the crawling paths, which again is difficult to realize in a conventional web crawler.

Due to the above problems, the latency and throughput of conventional web crawling models is often sub-optimal.

Illustrative embodiments of the invention provide data capture and storage techniques that enable users to explicitly indicate the accurate crawling paths to be followed by a web crawler. The data capture and storage techniques can be incorporated in big data storage systems so as to mitigate web data capture, storage and management overload for users. Moreover, the data capture and storage techniques can be incorporated in converged infrastructure (CI) systems. In one example, such data capture and storage techniques are incorporated in the Isilon® data storage system (commercially available from EMC Corporation, Hopkinton, Mass.).

The users may have domain knowledge on the URL irrelevance, which means that for certain types of URLs, the users may be confident that these URLs are definitely not on the (optimal) exploiting paths to target web pages and thus do not need to be exploited at all. For example, in the above case of crawling NBA news, it is known that URLs of society news are irrelevant. As such, in accordance with illustrative embodiments of the invention, users can indicate such URL irrelevance to the web crawler by encoding their domain knowledge into patterns of user-defined irrelevant URLs, and a URL relevance check is performed to automatically filter out irrelevant URLs so that the web crawler will not exploit those URLs and their corresponding web pages.

The user-defined irrelevant URL patterns may contain, but are not limited to, the following types of information: abstract expression of a set of URLs with regular expressions; URL type, i.e., the web resource to which the URL points (e.g., a HyperText Markup Language (HTML) page, a document or a picture); URL location within a web page; URL creation timestamp; etc.

A specific irrelevant URL pattern can be a combination of one or multiple types of information above and can be either inclusive or exclusive. An inclusive pattern tells exactly what the irrelevant URLs look like (e.g., all URLs containing string "society" are irrelevant), and an exclusive pattern tells exactly what the irrelevant URLs do not look like (e.g., URLs are irrelevant except those containing string "NBA").

The URL relevance check comprises a pattern matching process. Suppose there are n patterns, each URL will be checked against these patterns, either sequentially or in parallel. The URL is determined as irrelevant as long as it matches at least one pattern. Case by case, there may be optimizations applicable to accelerate the pattern matching process, e.g., changing the check sequence of patterns.

Further, in accordance with illustrative embodiments of the invention, the URLs to be inserted into the frontier set, i.e., to be crawled by the web crawler, are classified according to the corresponding web pages. For each class of URLs, their web pages have a distinct set of common characteristics, or are considered similar in contents and/or structure according to some measurable criteria. For instance, in above example of crawling NBA news, all URLs linking to Basketball news pages fall into a class, while all URLs linking to NBA news pages fall into another class.

The classification of URLs is conducted with rules which are derived from user knowledge and case-by-case with respect to diverse crawling jobs and websites. As will be further explained below, the classification rules encode critical information on the crawling URL paths from seed URLs to destination web pages.

The classification of URLs can be conducted based on, but not limited to, the following types of information: abstract expression of a set of URLs with regular expressions; URL type, i.e., the web resource to which the URL points (e.g., an HTML page, a document or a picture); URL location within a web page; URL creation timestamp; etc.

A specific URL classification rule can contain one or multiple types of the information above and should be deterministic.

Note that not only intermediate URLs on the crawling paths, but seed and destination URLs, are classified. Further, there is an "unknown" URL class which comprises all URLs that are potentially relevant yet cannot match any explicit classification rules.

The above URL classification is disjoint and inclusive. As a result, each URL in the frontier set falls into a dedicated URL class.

Accordingly, illustrative embodiments of the invention provide a crawling path topology. For a specific destination URL d, there exists a seed URL s and a crawling URL path p from s to d. We call p a physical crawling path, whose intermediate nodes are intermediate URLs. On such a URL path, a succeeding URL is contained in the web page of its preceding URL.

The above crawled URL classification determines that, for each existing physical crawling path $p_p = p_1 \rightarrow p_2 \rightarrow \ldots \rightarrow p_n$, there exists a corresponding logical crawling path $p_c = c_1 \rightarrow c_2 \rightarrow \ldots \rightarrow c_n$, whose nodes $\{c_i\}$ represent URL classes, and each URL $p_i$ on $p_p$ falls into the corresponding URL class of $c_i$.

For a specific web crawling job, its crawling path topology is defined as a directed graph, where the nodes represent URL classes, and a directed edge exists from class $c_i$ to class $c_j$ if and only if $c_i \rightarrow c_j$ is a sub-path of an existing logical crawling path. Here it is possible that $c_i = c_j$.

Figure 2:
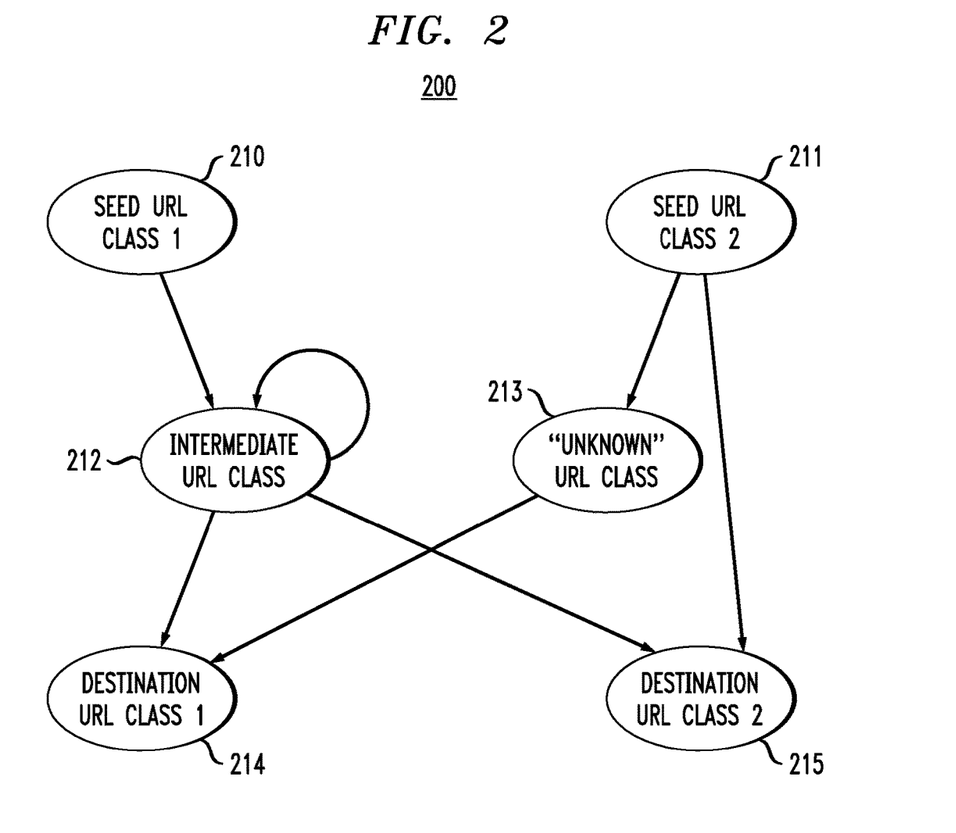
FIG. 2 illustrates a web crawling path topology, according to an embodiment of the invention.

FIG. 2 depicts an example of a crawling path topology according to an illustrative embodiment, where there are two seed URL classes 210 and 211, one intermediate URL class 212, two destination URL classes 214 and 215, and the "unknown" URL class 213.

It is to be understood that the crawling path topology indicates all the physical crawling paths that the web crawler should follow. In the following description, we explain how the web crawler can follow exactly these crawling paths so as to avoid irrelevant page crawling.

For each URL class, a separate work crawler is configured and dedicated to handle web pages of URLs belonging to this class.

For URLs extracted from the retrieved web pages, a relevance check is first applied. As explained above, an irrelevant URL can be safely discarded without affecting the final crawling results. For a relevant URL, it is classified according to the above mentioned classification rules, and then inserted into the frontier set of the corresponding URL class's work crawler.

As a result, the overall web crawling processing follows a federated working model. That is, there is a distributed cluster of work crawlers, each of which corresponds to a predefined URL class. One work crawler communicates with another work crawler for sending to-visit URLs to the latter, which forms a producer-consumer relationship. The work crawler communication topology thereby has an exact one-to-one mapping with the crawling path topology.

Under such a web crawler working model, only in the work crawler of the "unknown" URL class, irrelevant web pages may be accessed, downloaded and parsed as a result of irrelevant crawling path explorations. In other work crawlers, each retrieved web page generates relevant crawling information or results.

Figure 3:
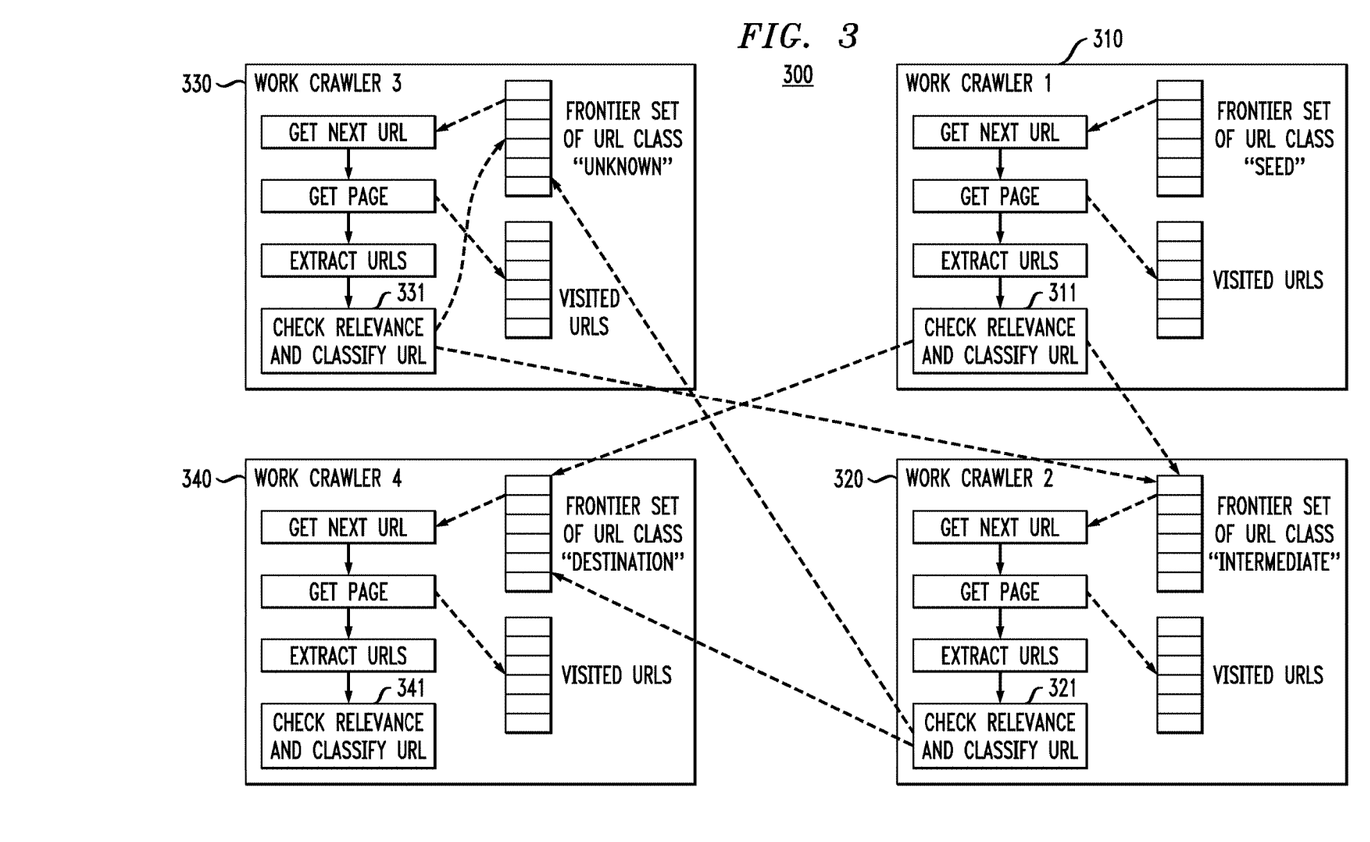
FIG. 3 illustrates a federated web crawling system, according to an embodiment of the invention.

FIG. 3 illustrates an example instance of web crawler system 300 employing the above mentioned federated web crawler working model, where there are one seed URL class, one intermediate URL class, one destination URL class and the "unknown" URL class.

More specifically, work crawler 1 (310) represents the seed URL class, worker crawler 2 (320) represents the intermediate URL class, work crawler 3 (330) represents the "unknown" URL class, and work crawler 4 (340) represents the destination URL class. Each work crawler (310, 320, 330 and 340) performs similar steps as explained above with respect to FIG. 1, i.e., the work crawler starts with a frontier (seed) set of to-visit URLs, downloads the associated web pages (get next URL, get page from Web, and store visited URLs in visited URL set; note that the target Web content is stored in a repository of system 300 not expressly shown), and extracts the URLs contained therein (extract URLs). As used herein, a work crawler is a specific example of a network search component.

However, before adding those extracted URLs that have not been visited before to the frontier set of to-visit URLs, and recursively continuing to download the web pages identified by to-visit URLs, the work crawler checks the relevance of the URL against the user-specified irrelevant URL pattern(s), as described above. Then, if determined to be relevant after the pattern matching process, the URL is classified in accordance with the classification rules that have been established in advance, as explained above. The classified URLs are then added to the frontier set of the work crawler representing the class to which the URL belongs.

As shown in FIG. 3, the relevance check and URL classification operations are performed by modules 311, 321, 331, and 341 for work crawlers 1, 2, 3, and 4, respectively. In this example instance, it is assumed that work crawler 1 provides one or more URLs to the frontier sets of work crawlers 2 and 3, work crawler 2 provides one or more URLs to the frontier sets of work crawlers 3 and 4, and work crawler 3 provides one or more URLs to the frontier set of work crawler 2. However, this is understood to be one example instance and therefore other examples of inter work crawler communication for sending to-visit URLs may be realized. Recall, as mentioned above, the work crawler communication topology has an exact one-one mapping with the crawling path topology. Also, it is to be appreciated that more or less work crawlers than those shown in FIG. 3 may be employed depending on the working model needed/ desired to perform the web crawling tasks. By way of example only, there may be no intermediate class (work crawler) or multiple intermediate classes (work crawlers).

The above federated web crawler working model illustrated in FIG. 3 is capable of distributed crawling in accordance with one or more illustrative embodiments. On the upper level, the work crawlers for the URL classes can be distributed over different cluster nodes and the communication between crawlers will be over a communication network. On the lower level, work crawlers can be distributed without the URL communication functionalities described herein.

Under the federated web crawler working model according to illustrative embodiments, each work crawler can have different implementations and configuration controls, in terms of, for instance, frontier set URL prioritization policies, "polite crawling" enforcement policies (to minimize load on web servers and respect websites' Robot Exclusion Protocol, i.e., robots.txt), replicated web content detection mechanism and distributed crawling approach, and so on.

Such implementation and configuration flexibility enables finer-grained controls over the crawling behaviors, taking into consideration the different characteristics of URL classes which may therefore require different treatments.

Furthermore, under the federated web crawler working model according to illustrative embodiments, web crawling resources (e.g., compute, memory and storage capacity) can be dynamically allocated among different work crawlers in order to further improve system resource utilization.

On the one hand, different URL classes may require different processing capabilities; on the other hand, different work crawlers' workloads may change over time. As such, illustrative embodiments leverage resource scheduling techniques developed for cloud computing. For example, after all seed URLs have been processed, the allocated crawling resources can be re-assigned to other ongoing crawling tasks.

As a result, both fine-grained control and dynamic resource scheduling according to illustrative embodiments lead to crawling performance improvement.

Figure 4:
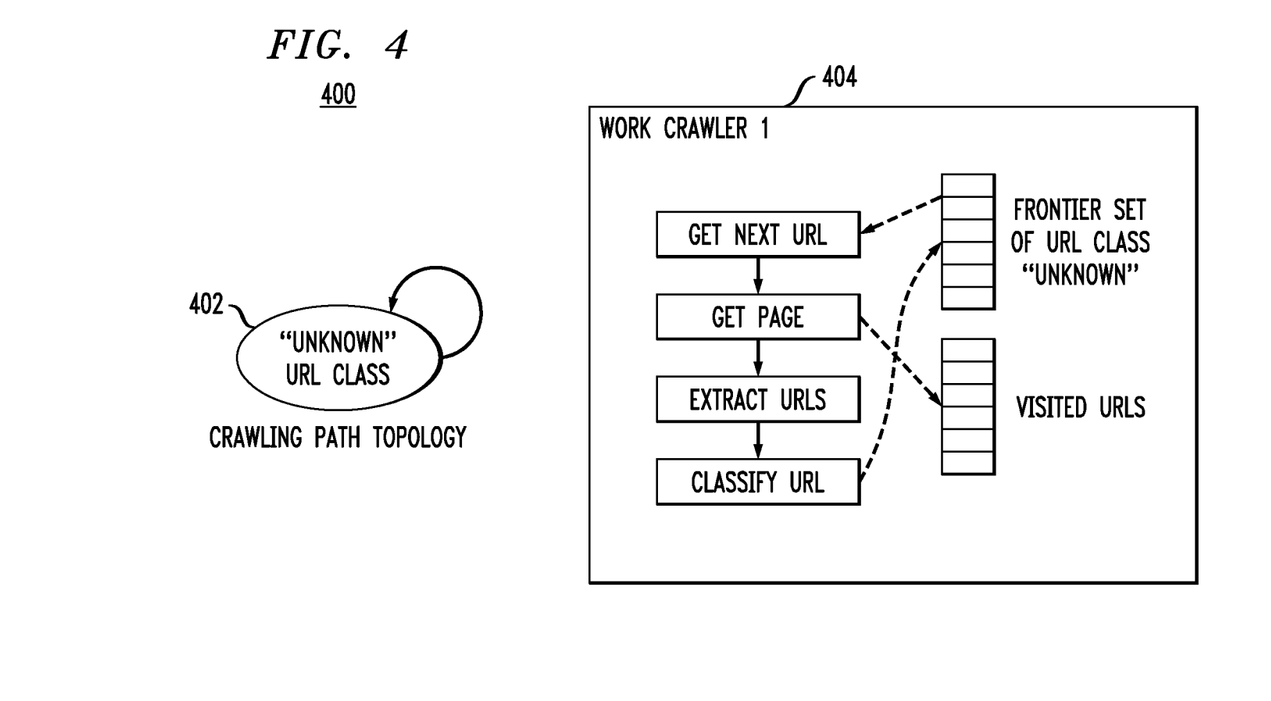
FIG. 4 illustrates a use case of a federated web crawling system, according to an embodiment of the invention.

It is to be appreciated that the web crawler working model depicted in FIG. 1 can be considered as a special case of the federated web crawler working model depicted in FIG. 3. In this case, there are no explicit crawling path knowledge inputs, and thus all to-visit URLs fall into the "unknown" URL class. The corresponding crawling path topology 402 and working model instance 404 are shown in system 400 of FIG. 4. Moreover, the federated web crawler working model is orthogonal to existing implementation and optimization techniques and thus can seamlessly integrate with them.

Figure 5:
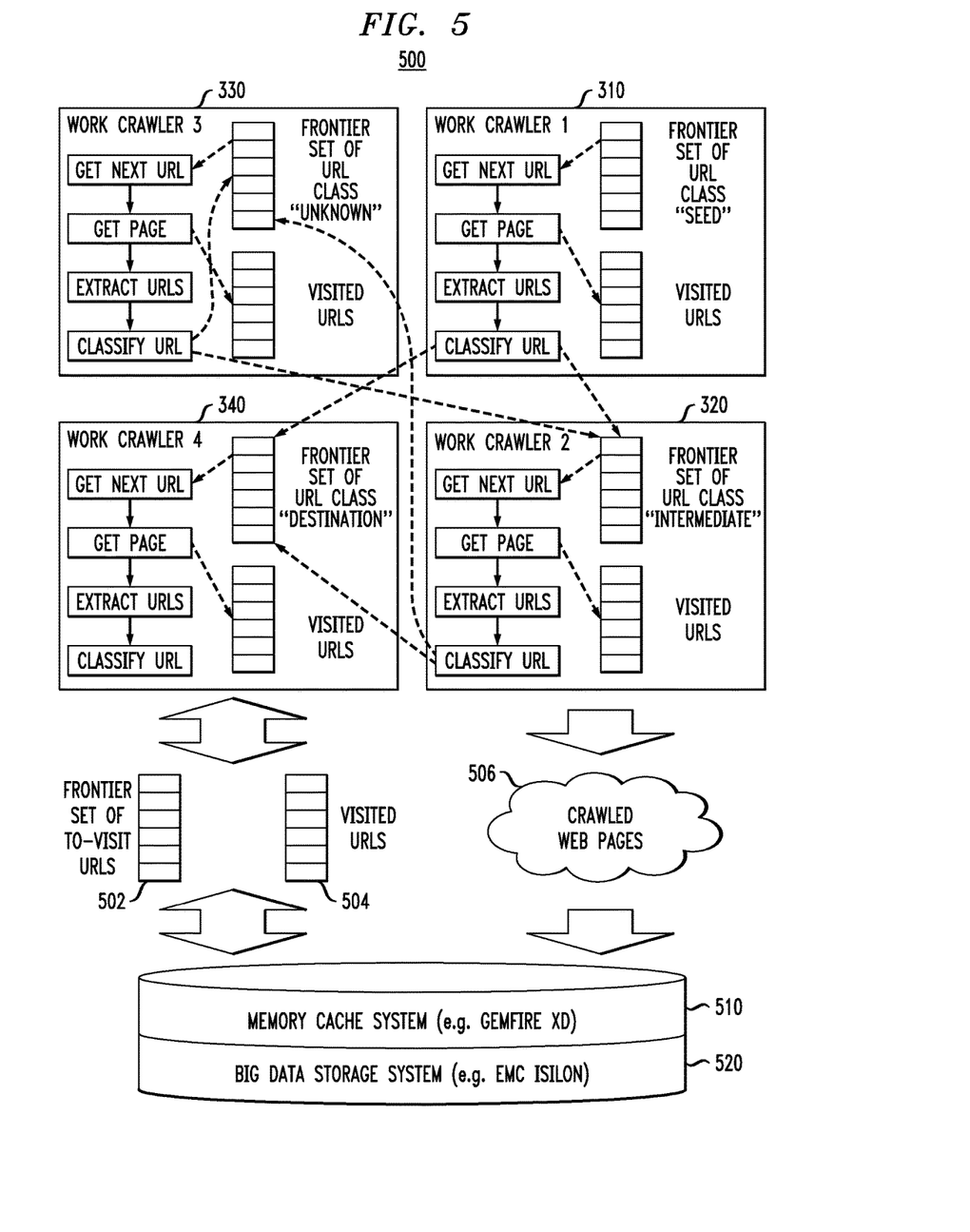
FIG. 5 illustrates a federated web crawling and storage system, according to embodiments of the invention.

FIG. 5 illustrates a federated web crawling and storage system, according to embodiments of the invention. As shown, work crawlers 310, 320, 330, and 340 function as explained above in the context of FIG. 3. In the federated web crawler environment, there are three types of data to be stored into and/or retrieved back from the underlying storage system, which is comprised of a memory cache system 510 and a big data storage system 520. These types of data are:

1. An overall frontier set 502 which contains the frontier sets of to-visit URLs belonging to the different work crawlers (310, 320, 330, and 340). The frontier sets are updated at runtime, with visited URLs removed and newly collected to-visit URLs inserted.

2. An overall visited URLs set 504 which contains the visited sets of URLs belonging to the different work crawlers (310, 320, 330, and 340). At runtime, a newly parsed URL of a certain class is first compared with the visited URLs of the corresponding work crawler, and only un-visited URLs are inserted into the frontier set; after a URL is visited, it is inserted into the corresponding visited set.

3. The crawled web pages 506 are append-only stored.

In practical deployment, it is realized that both frontier sets and visited sets of URLs are at large scale and are updated frequently. As such, illustrative embodiments deploy a memory cache system 510 using an in-memory data grid such as Gemfire® XD (commercially available from Pivotal Software Inc., Palo Alto, Calif.) to improve the input/output (IO) performance. The memory cache system 510 serves as both a writing cache for batched data loading into the underlying persistent storage system 520 (e.g., Isilon®), and a read cache for mostly frequently accessed URL data.

In terms of web data capture and storage orchestration, illustrative embodiments provide a variety of approaches.

In one example, as web data are continuously crawled from the Web, they are also continuously loaded into the underlying storage system 520. Alternatively, in another example, the crawled web data is temporarily stored in another high-performance yet small-scale storage layer (e.g., XtremIO® flash array commercially available from EMC Corporation, Hopkinton, Mass.) in between memory (510) and the underlying large-scale storage system (520). After the crawling processing completes, the data is bulk loaded into the underlying large-scale storage system (e.g., Isilon®). Such a multi-layer hierarchical storage can ensure the speed matching between data capture and storage, as well as enable more flexible configuration of storage performance and cost trade-off.

In one example implementation, a federated web crawler system with URL classification according to one or more illustrative embodiments has been built by connecting the web crawler system to an Isilon® system as the underlying big data storage system. More specifically, the URL data is accessed via the network attached storage (NAS) file interface of Isilon®, and the web data is loaded into Isilon® via the server message block (SMB) protocol and afterwards accessed by upper-layer's analytics applications via a Hadoop distributed file system (HDFS) interface.

Figure 6:
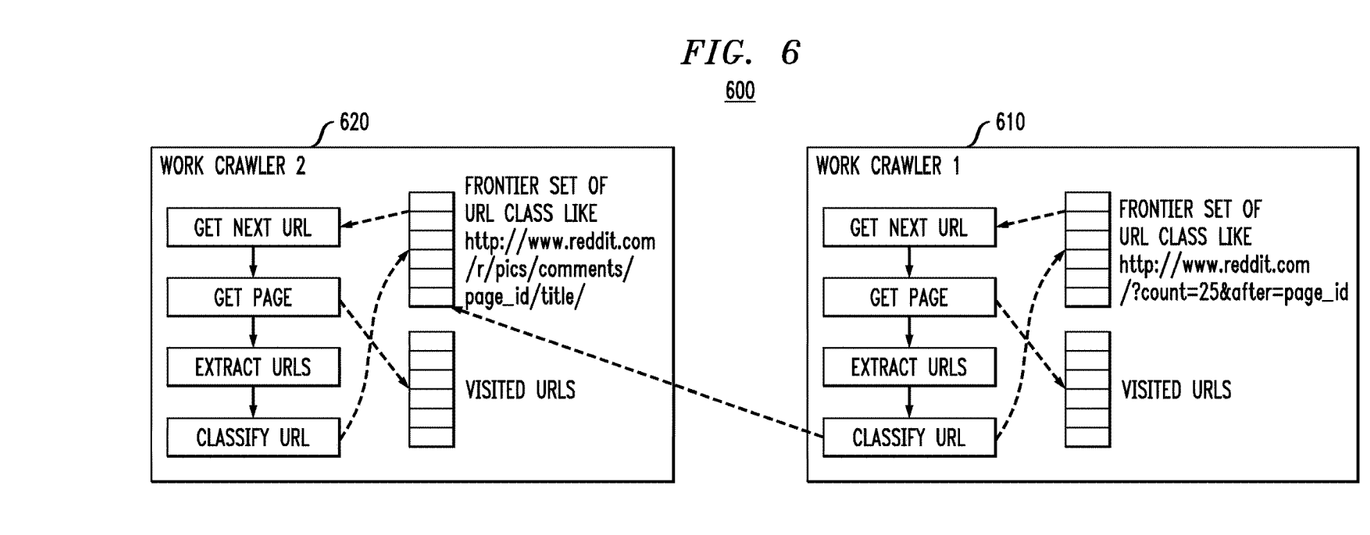
FIG. 6 illustrates a website comments crawling example, according to an embodiment of the invention.

Reddit (www.reddit.com) is an entertainment, social networking service and news website where registered community members can submit content, such as text posts or direct links. FIG. 6 shows a crawling example 600 according to illustrative embodiments in the context of the Reddit website. Assume that the system seeks to get all comments of each post associated with certain pages of the website. After analyzing the website structure, it is found there are two classes of URL links that are relevant to the crawling objective, one is the user-generated content (UGC) container link with a regex pattern of "http://www.reddit.com/?count=25&after=page_id", and the other is the comment link with a regex pattern of "http://www.reddit.com/r/pics/comments/page_id/title/". In this example, assume that each UGC container page contains 25 UGC items and each item refers to one comment page.

It is evident that there is parent-child relationship between these two classes of URLs. So, the federated web crawling system is set up with two work crawlers to crawl the website as illustrated in FIG. 6. The parent work crawler (work crawler 1 denoted as 610) collects and parses all UGC container pages, then saves all parsed comment page URLs to the frontier set in the child work crawler (work crawler 2 denoted as 620). The child work crawler parses all comment pages and saves the comments to the persistent data store (e.g., 520 in FIG. 5). As each UGC container page will generate 25 comment pages, the system allocates more resources to the child work crawler in order to keep its crawling speed consistent with the parent work crawler.

Figure 7:
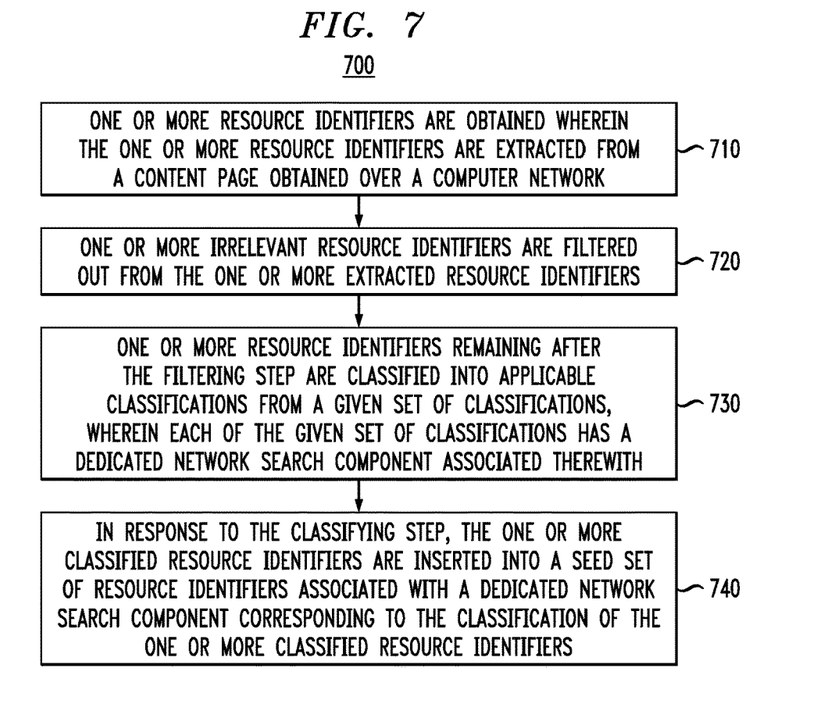
FIG. 7 illustrates a methodology for federated web crawling, according to an embodiment of the invention.

FIG. 7 illustrates a methodology 700 for federated web crawling, according to an embodiment of the invention.

As shown in step 710, one or more resource identifiers (e.g., URLs) are obtained wherein the one or more resource identifiers are extracted from a content page (e.g., web content) obtained over a computer network (e.g., the web).

In step 720, one or more irrelevant resource identifiers are filtered out from the one or more extracted resource identifiers.

In step 730, one or more resource identifiers remaining after the filtering step are classified into applicable classifications from a given set of classifications, wherein each of the given set of classifications has a dedicated network search component (e.g., work crawlers) associated therewith.

In step 740, in response to the classifying step, the one or more classified resource identifiers are inserted into a seed set of resource identifiers associated with a dedicated network search component corresponding to the classification of the one or more classified resource identifiers. The respective seed sets are then processed by the work crawlers possibly generating further resource identifiers for filtering and classifying.

Figure 8:
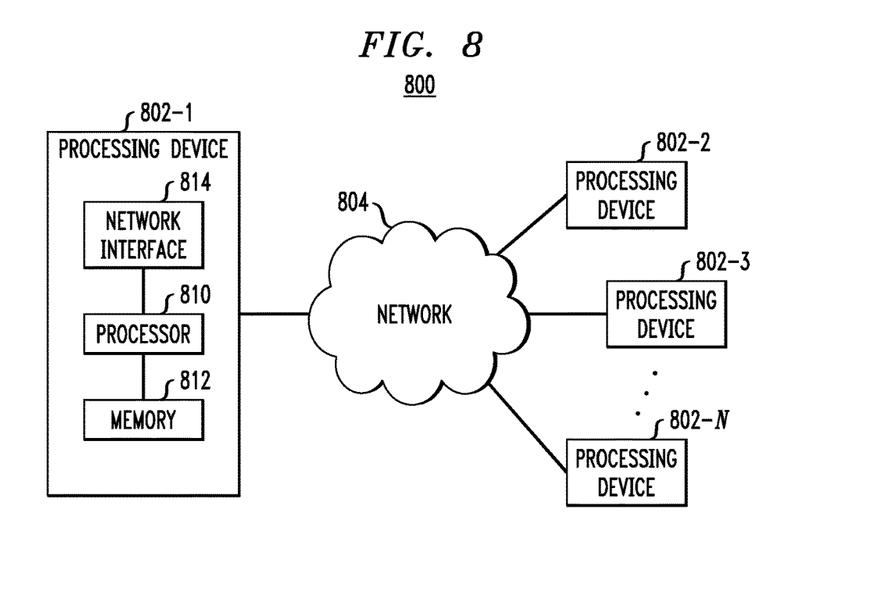
FIG. 8 illustrates a processing platform used to implement a web crawling and storage system environment, according to an embodiment of the invention.

As an example of a processing platform on which a federated web crawling and storage system (e.g., 500 of FIG. 5) can be implemented is processing platform 800 shown in FIG. 8. The processing platform 800 in this embodiment comprises a plurality of processing devices, denoted 802-1, 802-2, 802-3, . . . 802-N, which communicate with one another over a network 804. It is to be appreciated that the methodologies described herein may be executed in one such processing device 802, or executed in a distributed manner across two or more such processing devices 802. It is to be further appreciated that a server, a client device, a computing device or any other processing platform element may be viewed as an example of what is more generally referred to herein as a "processing device." As illustrated in FIG. 8, such a device generally comprises at least one processor and an associated memory, and implements one or more functional modules for instantiating and/or controlling features of systems and methodologies described herein. Multiple elements or modules may be implemented by a single processing device in a given embodiment.

The processing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 810. Memory 812 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 812 may comprise electronic memory such as random access memory (RAM), read-only memory (ROM) or other types of memory, in any combination. The one or more software programs when executed by a processing device such as the processing device 802-1 causes the device to perform functions associated with one or more of the components/steps of system/methodologies in FIGS. 1-7. One skilled in the art would be readily able to implement such software given the teachings provided herein. Other examples of processor-readable storage media embodying embodiments of the invention may include, for example, optical or magnetic disks.

Processing device 802-1 also includes network interface circuitry 814, which is used to interface the device with the network 804 and other system components. Such circuitry may comprise conventional transceivers of a type well known in the art.

The other processing devices 802 (802-2, 802-3, . . . 802-N) of the processing platform 800 are assumed to be configured in a manner similar to that shown for computing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in this figure is presented by way of example only, and the federated web crawling and storage system shown as 500 in FIG. 5 may include additional or alternative processing platforms, as well as numerous distinct processing platforms in any combination.

Also, numerous other arrangements of servers, clients, computers, storage devices or other components are possible in processing platform 800. Such components can communicate with other elements of the processing platform 800 over any type of network, such as a wide area network (WAN), a local area network (LAN), a satellite network, a telephone or cable network, or various portions or combinations of these and other types of networks.

Furthermore, it is to be appreciated that the processing platform 800 of FIG. 8 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 800 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 800 in one or more embodiments of the invention is the VMware vSphere® (commercially available from VMware Inc., Palo Alto, Calif.) which may have an associated virtual infrastructure management system such as the VMware vCenter®. The underlying physical infrastructure may comprise one or more distributed processing platforms that include storage products such as, but not limited to, Isilon®, VNX® and Symmetrix® VMAX® (commercially available from EMC Corporation, Hopkinton, Mass.). A variety of other computing and storage products may be utilized to implement the one or more services that provide the functionality and features described herein.

It was noted above that portions of the system environment 500 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   obtaining one or more resource identifiers extracted from a content page obtained over a computer network;
   filtering out one or more irrelevant resource identifiers from the one or more extracted resource identifiers based on a given resource identifier irrelevance pattern, wherein the given resource identifier irrelevance pattern is inclusive or exclusive and further wherein the given resource identifier irrelevance pattern is specified by a user based on user domain knowledge of content being sought;
   classifying the one or more resource identifiers remaining after the filtering step into one or more classifications from a given set of classifications, wherein the classifying step is conducted in accordance with one or more classification rules derived from the user domain knowledge of content being sought;
   inserting the one or more classified resource identifiers into a seed set of resource identifiers associated with dedicated network search components corresponding to respective ones of the classifications of the one or more classified resource identifiers; and
   dynamically allocating one or more resources for network searching among the dedicated network search components based on the one or more inserted resource identifiers;
   wherein the above steps are performed by one or more processing devices each comprising a processor operatively coupled to a memory.

2. The method of claim 1, wherein the one or more classifications of the given set of classifications define a search path topology.

3. The method of claim 2, wherein the search path topology comprises one or more paths, wherein a given one of the one or more paths comprises at least a starting resource identifier and a destination resource identifier, and wherein each resource identifier in the given path represents a classification in the given set of classifications.

4. The method of claim 3, wherein, for a physical path $p_p$ having nodes $p_1 \to p_2 \to \ldots \to p_n$, there exists a corresponding logical path $p_c$ having nodes $c_1 \to c_2 \to \ldots \to c_n$, whose nodes $\{c_i\}$ represent resource identifier classes, and each resource identifier $p_i$ on $p_p$ falls into the corresponding resource identifier class of $c_i$.

5. The method of claim 4, wherein for a specific network search task, the search path topology is defined as a directed graph, where nodes of the graph represent resource identifier classes, and a directed edge exists from class $c_i$ to class $c_j$ if $c_i \to c_j$ is a sub-path of an existing logical path.

6. The method of claim 1, further comprising classifying the one or more irrelevant resource identifiers into a classification denoted as unknown in the given set of classifications.

7. The method of claim 1, wherein at least one of the classifications of the given set of classifications is in a parent-child relationship with respect to at least another one of the classifications of the given set of classifications.

8. An article of manufacture comprising a processor-readable storage medium having encoded therein executable code of one or more software programs, wherein the one or more software programs when executed by one or more processing devices implement steps of claim 1.

9. An apparatus comprising:
   a memory; and
   a processor operatively coupled to the memory and configured to:
   obtain one or more resource identifiers extracted from a content page obtained over a computer network;
   filter out one or more irrelevant resource identifiers from the one or more extracted resource identifiers based on a given resource identifier irrelevance pattern, wherein the given resource Identifier irrelevance pattern is inclusive or exclusive and further wherein the given resource identifier irrelevance pattern is specified by a user based on user domain knowledge of content being sought;
   classify the one or more resource identifiers remaining after the filtering step into one or more classifications from a given set of classifications, wherein the classifying is conducted in accordance with one or more classification rules derived from the user domain knowledge of content being sought;
   insert the one or more classified resource identifiers into a seed set of resource identifiers associated with dedicated network search components corresponding to respective ones of the classifications of the one or more classified resource identifiers; and dynamically allocate one or more resources for network searching among the dedicated network search components based on the one or more inserted resource identifiers.

10. A system comprising:

a network searching system comprising a set of work crawlers distributed across a computer network, wherein each work crawler in the set of work crawlers corresponds to a predefined resource identifier class, and one work crawler communicates with another work crawler for sending resource identifiers of at least one frontier set of resource identifiers to the other forming a producer-consumer relationship such that the work crawler communication topology has a one-to-one mapping with a crawling path topology;

wherein at least two of the work crawlers are dynamically allocated to have different processing capabilities for network searching based on their respective predefined resource identifier classes;

wherein each work crawler is configured to:

obtain one or more resource identifiers extracted from a content page obtained over a computer network;

filter out one or more irrelevant resource identifiers from the one or more extracted resource identifiers based on a given resource identifier irrelevance pattern, wherein the given resource identifier irrelevance pattern is inclusive or exclusive and further wherein the given resource identifier irrelevance pattern is specified by a user based on user domain knowledge of content being sought;

classify the one or more resource identifiers remaining after the filtering step into one or more classifications from a given set of classifications, wherein the classifying is conducted in accordance with one or more classification rules derived from the user domain knowledge of content being sought; and insert the one or more classified resource identifiers into the at least one frontier set of resource identifiers associated with dedicated network search components corresponding to respective ones of the classifications of the one or more classified resource identifiers; and a storage system comprising at least one storage device and operatively coupled to the network crawling system, wherein the storage system is configured to store resource identifiers within the at least one frontier set and content obtained during traversal of the crawling path topology.

11. The system of claim 10, wherein the storage system comprises a memory cache system and a persistent storage system.

12. The system of claim 10, wherein at least two of the work crawlers are configured to implement different operational policies.

13. The system of claim 10, wherein the computer network comprises the World Wide Web.

14. The apparatus of claim 9, wherein the one or more irrelevant resource identifiers are filtered out from the one or more extracted resource identifiers based on a given resource identifier irrelevance pattern.

15. The apparatus of claim 9, wherein the one or more classifications of the given set of classifications define a search path topology.

16. The apparatus of claim 15, wherein the search path topology comprises one or more paths, wherein a given one of the one or more paths comprises at least a starting resource identifier and a destination resource identifier, and wherein each resource identifier in the given path represents a classification in the given set of classifications.

17. The apparatus of claim 16, wherein, for a physical path $p_p$ having nodes $p_1 \rightarrow p_2 \rightarrow \ldots \rightarrow p_n$, there exists a corresponding logical path $p_c$ having nodes $c_1 \rightarrow c_2 \rightarrow \ldots \rightarrow c_n$, whose nodes $\{c_i\}$ represent resource identifier classes, and each resource identifier $p_i$ on $p_p$ falls into the corresponding resource identifier class of $c_i$.

18. The apparatus of claim 17, wherein for a specific network search task, the search path topology is defined as a directed graph, where nodes of the graph represent resource identifier classes, and a directed edge exists from class $c_i$ to class $c_j$ if $c_i \rightarrow c_j$ is a sub-path of an existing logical path.

19. The apparatus of claim 9, wherein the processor is further configured to classify the one or more irrelevant resource identifiers into a classification denoted as unknown in the given set of classifications.

* * * * *

UNITED STATES PATENT AND TRADEMARK OFFICE
CERTIFICATE OF CORRECTION

PATENT NO. : 10,007,733 B1
APPLICATION NO. : 14/734037
DATED : June 26, 2018
INVENTOR(S) : Yu Cao et al.

It is certified that error appears in the above-identified patent and that said Letters Patent is hereby corrected as shown below:

In the Specification

Column 2, Line 37, please delete "Word" and replace it with --World--

In the Claims

Claim 9, Column 12, Line 52, please delete "Identifier" and replace it with --identifier--

Signed and Sealed this
Twenty-eighth Day of May, 2019

Andrei Iancu
*Director of the United States Patent and Trademark Office*